US012209439B2

(12) United States Patent
Liang

(10) Patent No.: US 12,209,439 B2
(45) Date of Patent: Jan. 28, 2025

(54) ELECTRONIC DOOR LOCK

(71) Applicant: Shitong Liang, Guangdong (CN)

(72) Inventor: Shitong Liang, Guangdong (CN)

(73) Assignees: Shenzhen Hongzhong Lock Industry Co., Ltd., Shenzhen (CN); NOVUS TECHNOLOGY LLC, Bridgewater, NJ (US)

( * ) Notice: Subject to any disclaimer, the term of this patent is extended or adjusted under 35 U.S.C. 154(b) by 0 days.

(21) Appl. No.: 18/782,029

(22) Filed: Jul. 24, 2024

(65) Prior Publication Data

US 2024/0376755 A1 Nov. 14, 2024

(51) Int. Cl.

| | |
|---|---|
| ***E05B 81/06*** | (2014.01) |
| ***E05B 81/14*** | (2014.01) |
| ***E05B 81/18*** | (2014.01) |
| ***E05B 81/30*** | (2014.01) |
| ***E05B 81/34*** | (2014.01) |
| ***E05B 83/44*** | (2014.01) |

(52) U.S. Cl.

CPC .............. *E05B 81/30* (2013.01); *E05B 81/06* (2013.01); *E05B 81/14* (2013.01); *E05B 81/18* (2013.01); *E05B 81/34* (2013.01); *E05B 83/44* (2013.01)

(58) Field of Classification Search

CPC .......... E05B 81/30; E05B 81/06; E05B 81/14; E05B 81/18; E05B 81/34; E05B 83/44

See application file for complete search history.

(56) References Cited

U.S. PATENT DOCUMENTS

2020/0308880 A1* 10/2020 Lin .................... E05B 47/0657

* cited by examiner

*Primary Examiner* — Michael P Ferguson
*Assistant Examiner* — Thomas L Neubauer

(57) ABSTRACT

A novel electronic door lock includes a shell, an outer handle and an elastic sliding tongue arranged in the shell. The elastic sliding tongue is threaded out from a first opening of the shell. The outer handle acts on the elastic sliding tongue to push the elastic sliding tongue back to the shell from the first opening. The shell includes a first clutch device and a limiting member. The first clutch device includes a first motor and a first transmission assembly connected to the first motor in a transmission manner. The first transmission assembly is connected to the limiting member. The first transmission assembly drives the limiting member to move to limit the pushing performed by the outer handle on the elastic sliding tongue.

17 Claims, 7 Drawing Sheets

ELECTRONIC DOOR LOCK

TECHNICAL FIELD

The present disclosure relates to the technical field of locks, and in particular, to a novel electronic door lock.

BACKGROUND OF THE INVENTION

Electronic door locks for recreational vehicles at present are all provided with a clutch device to control extension and retraction of a lock tongue. The existing clutch device has a complex structure and relatively low stability, so there is an urgent need for an electronic door lock with a clutch device having a simple structure and high stability.

SUMMARY OF THE INVENTION

The present disclosure aims to provide a novel electronic door lock.

The novel electronic door lock includes a shell, an outer handle, and an elastic sliding tongue arranged in the shell. The elastic sliding tongue is threaded out from a first opening of the shell; the outer handle acts on the elastic sliding tongue to push the elastic sliding tongue back to the shell from the first opening; the shell includes a first clutch device and a limiting member; the first clutch device includes a first motor and a first transmission assembly connected to the first motor in a transmission manner; the first transmission assembly is connected to the limiting member; and the first transmission assembly drives the limiting member to move to limit the pushing performed by the outer handle on the elastic sliding tongue.

Further, the novel electronic door lock further includes a first mounting slot provided in the shell, one end of the first mounting slot extends to the shell to form the first opening; the elastic sliding tongue is slidably arranged in the first mounting slot; the elastic sliding tongue includes an elastic member and a sliding tongue; one end of the elastic member is abutted to the other end of the first mounting slot; and the other end of the elastic member is abutted to the sliding tongue to push the sliding tongue to be threaded out of the first opening.

Further, the shell further includes a second opening; the second opening penetrates through a side wall of the first mounting slot; the outer handle is provided with a first unlocking lever; and the first unlocking lever penetrates into the second opening and is abutted to the sliding tongue.

Further, one end of the sliding tongue close to the elastic member forms a pushing portion; one end of the pushing portion is abutted to the elastic member; and the other end is abutted to the first unlocking lever.

Further, a limiting hole is provided at one end of the pushing portion close to the elastic member; and the limiting hole is configured to plug the elastic member.

Further, a limiting slot is provided at one end of the pushing portion close to the first unlocking lever; and the limiting member penetrates into the limiting slot to limit the pushing performed by the first unlocking lever on the pushing portion.

Further, the electronic door lock further includes an inner handle; and the inner handle acts on the pushing portion to push the elastic sliding tongue to retract into the shell from the first opening.

Further, the shell further includes a third opening; the third opening penetrates through a side wall of the first mounting slot; the inner handle is provided with a second unlocking lever; the pushing portion is provided with a third unlocking lever; and the second unlocking lever penetrates into the third opening and is abutted to the third unlocking lever.

Further, a first worm is arranged at a driving end of the first motor; the first transmission assembly includes a first transmission shaft, a first transmission gear, and a second transmission gear; the limiting member is a gear; the first transmission gear and the second transmission gear are both connected to the first transmission shaft; the first worm is in meshing connection to the first transmission gear; and the limiting member is in meshing connection to the second transmission gear.

Further, the first clutch device further includes a first lock cylinder; and the first lock cylinder is connected to the first transmission shaft in a transmission manner.

Further, the electronic door lock further includes a first driving module; and the first driving module is in communicative connection to the first motor and a control terminal respectively.

Further, the shell further includes a safety tongue, a second clutch device, and a fourth opening; the second clutch device includes a second motor and a second transmission assembly connected to the second motor in a transmission manner; and the second transmission assembly is connected to the safety tongue to drive expansion and retraction of the safety tongue in the fourth opening.

Further, a second worm is arranged at a driving end of the second motor; the second transmission assembly includes a second transmission shaft, a third transmission gear, and an eccentric transmission wheel; the third transmission gear and the eccentric transmission wheel are both connected to the second transmission shaft; the second worm is in meshing connection to the third transmission gear; and the eccentric transmission wheel is connected to the safety tongue in a transmission manner.

Further, the second clutch device further includes a connecting rod; the eccentric transmission wheel includes an eccentric portion; both the eccentric portion and the safety tongue are provided with connecting holes; and the connecting rod passes through the connecting holes to achieve connection between the eccentric portion and the safety tongue.

Further, the second clutch device further includes a second lock cylinder; and the second lock cylinder is connected to one end of the second transmission shaft in a transmission manner.

Further, the second clutch device further includes a safety tongue knob; and the safety tongue knob is connected to the other end of the second transmission shaft in a transmission manner.

Further, the electronic door lock further includes a second driving module; and the second driving module is in communicative connection to the second motor and the control terminal respectively.

Further, the shell is provided with a digital password module on one side of the outer handle; and the digital password module is in communicative connection to the first motor.

Compared with the prior art, the present disclosure has the beneficial effects below: the first clutch device of the present disclosure can achieve the limitation on the outer handle by cooperating with the limiting member due to the arrangement of the first motor and the first transmission assembly. The novel electronic door lock has a simple structure, convenience of operation, production, and assembling, and high mechanical stability. The production efficiency is improved; the production cost is reduced; the yield of the product is further increased; and the user experience is greatly enhanced.

DETAILED DESCRIPTION OF THE INVENTION

Figure 1:
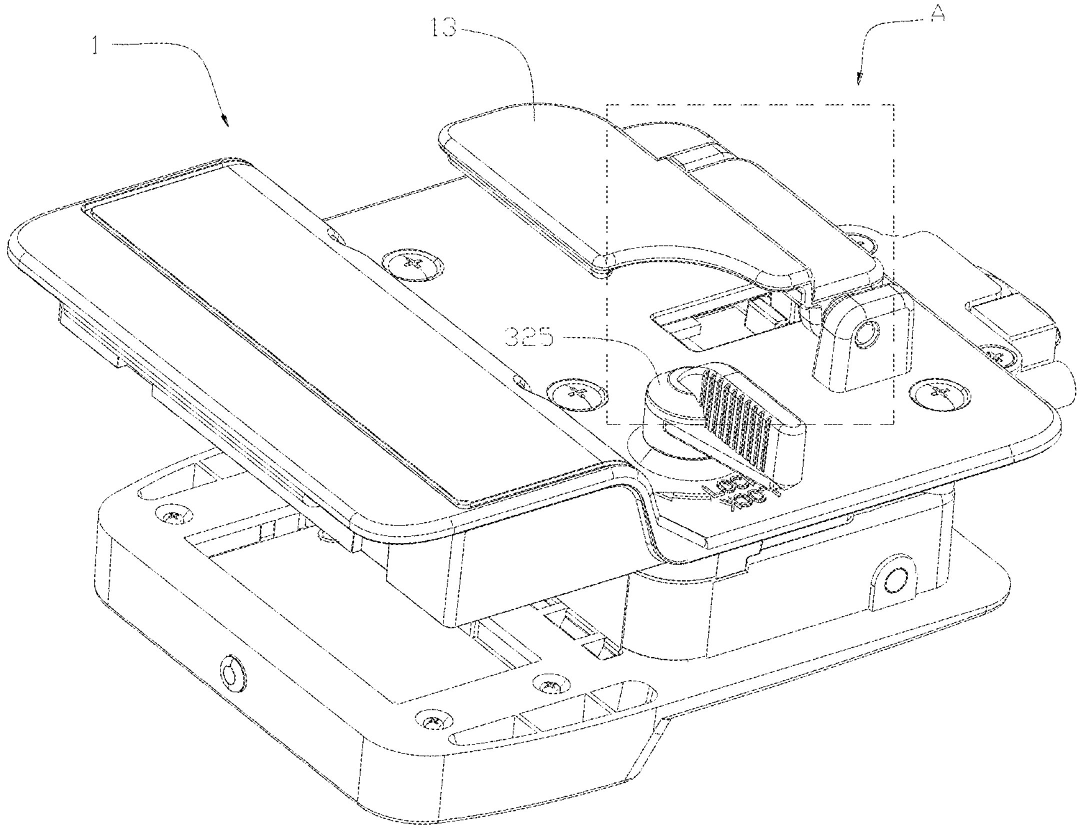
FIG. 1 is a three-dimensional state diagram according to the present disclosure.

It is to be noted that embodiments in the present disclosure and features in the embodiments may be combined with each other without conflict.

In the description of the present disclosure, It is to be understood that, The terms "center", "longitudinal", "transverse", "upper", "lower", "front", "rear", "left", "right", "vertical", "horizontal", "top", "bottom", "inner", "outer", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure; in addition, The terms "first" and "second" are used for descriptive purposes only, While not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

In the description of the present disclosure, it is to be noted that unless otherwise expressly specified and defined, the terms "mounted", "connected", and "connected" are to be construed broadly, for example, as either a fixed connection, or a detachable connection, or an integral connection, either a mechanical connection, or an electrical connection. The specific meaning of the above term in the present disclosure will be understood by those of ordinary skill in the art depending on the particular circumstances, either directly or indirectly via an intermediate medium, communication between the two elements, or interaction between the two elements. The specific meanings of these terms in the present disclosure will be understood by those of ordinary skill in the art as the case may be.

The present disclosure is further described below in combination with accompanying drawings and implementations.

Figure 2:
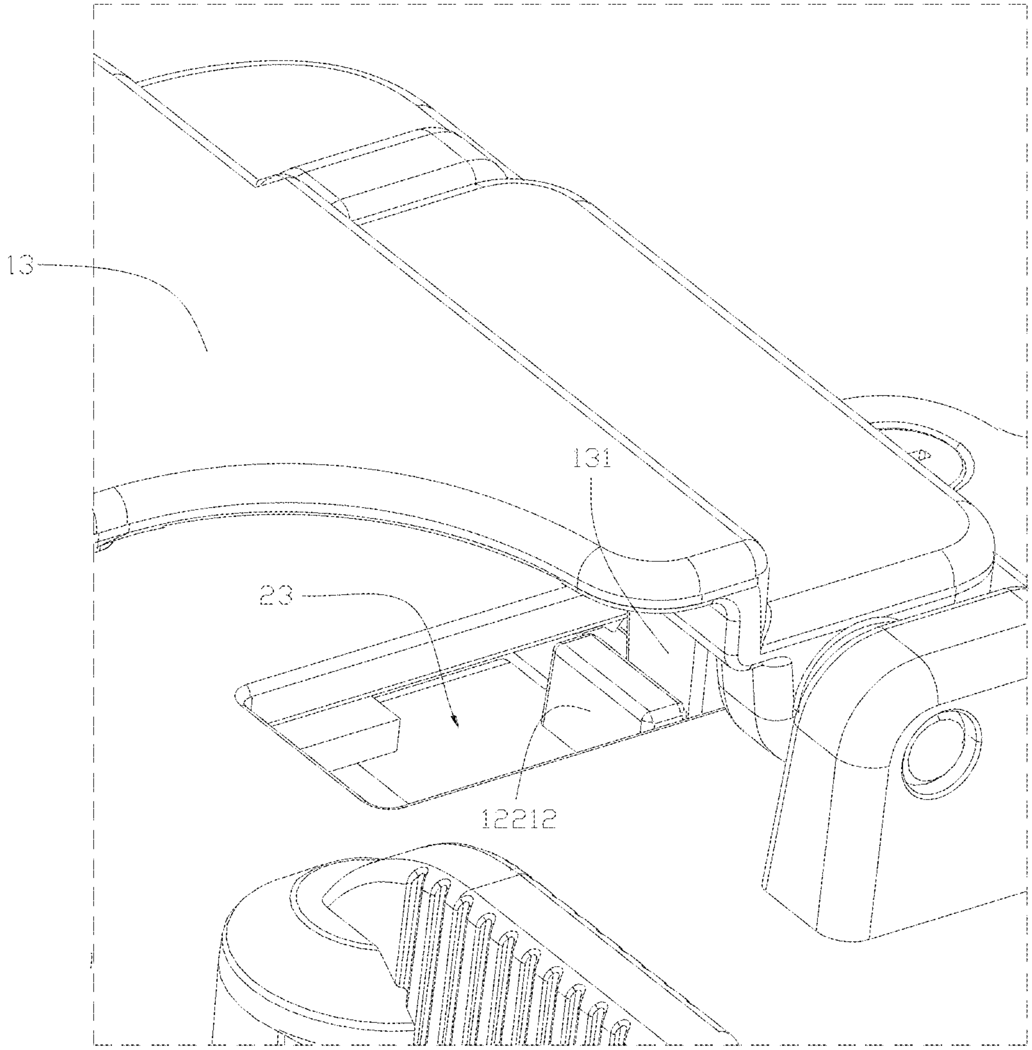
FIG. 2 is a partially enlarged diagram of part A.
Figure 3:
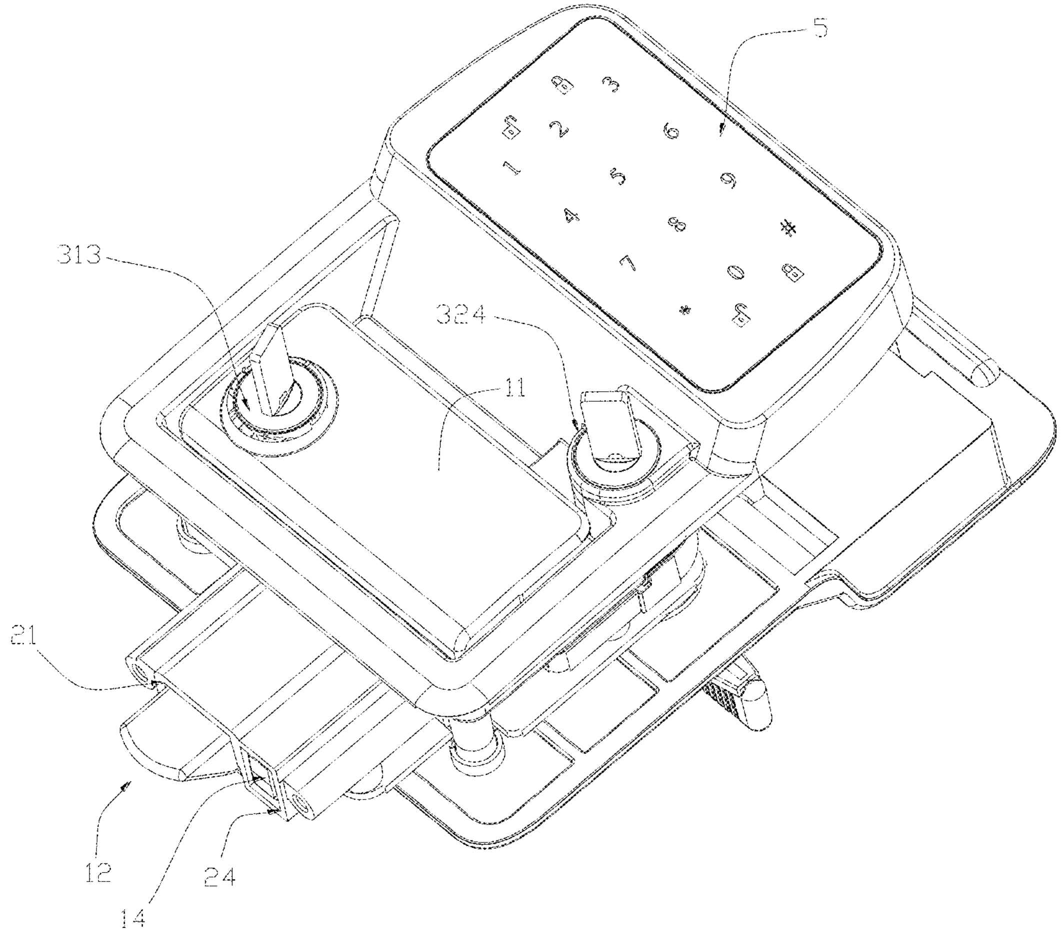
FIG. 3 is another three-dimensional state diagram according to the present disclosure.
Figure 4:
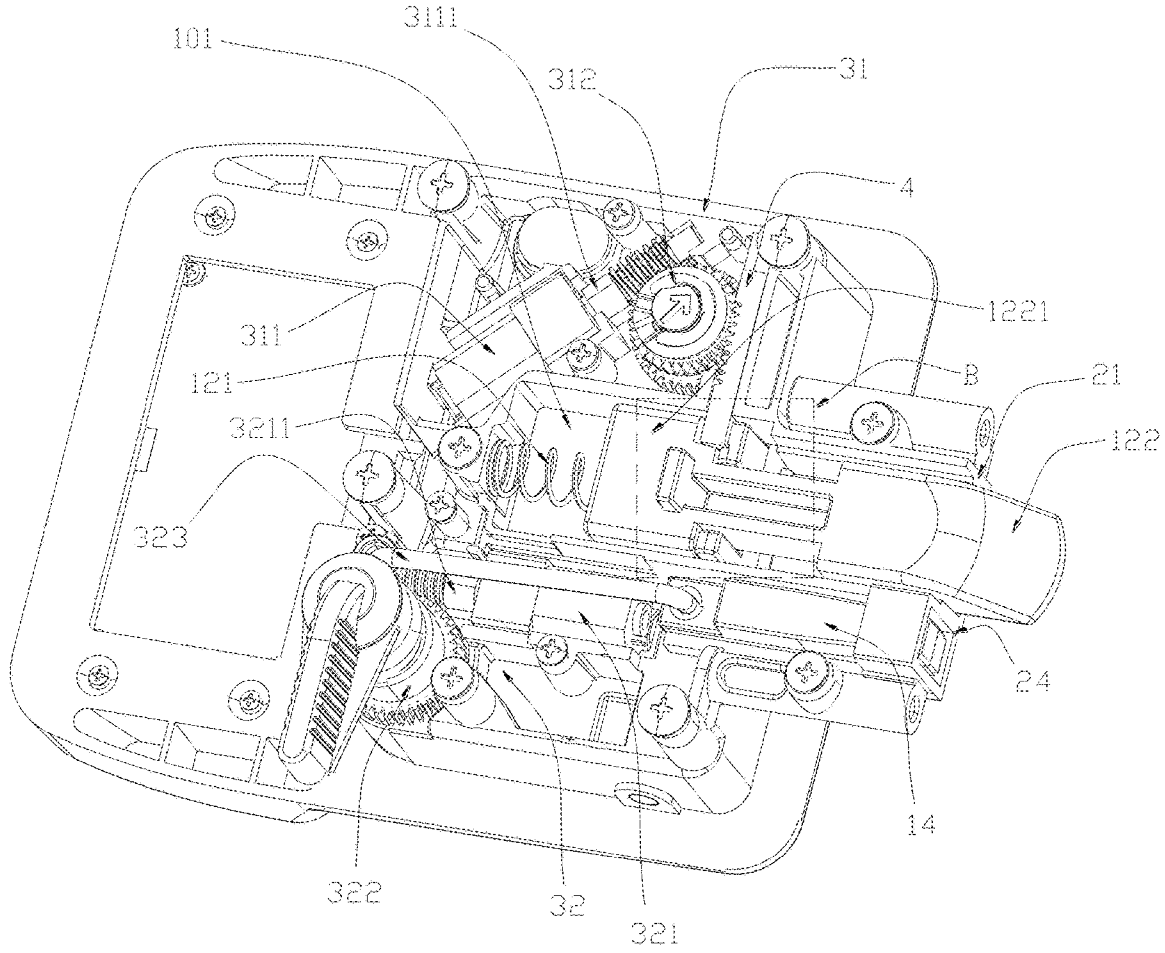
FIG. 4 is a presentation diagram of an internal structure according to the present disclosure.
Figure 5:
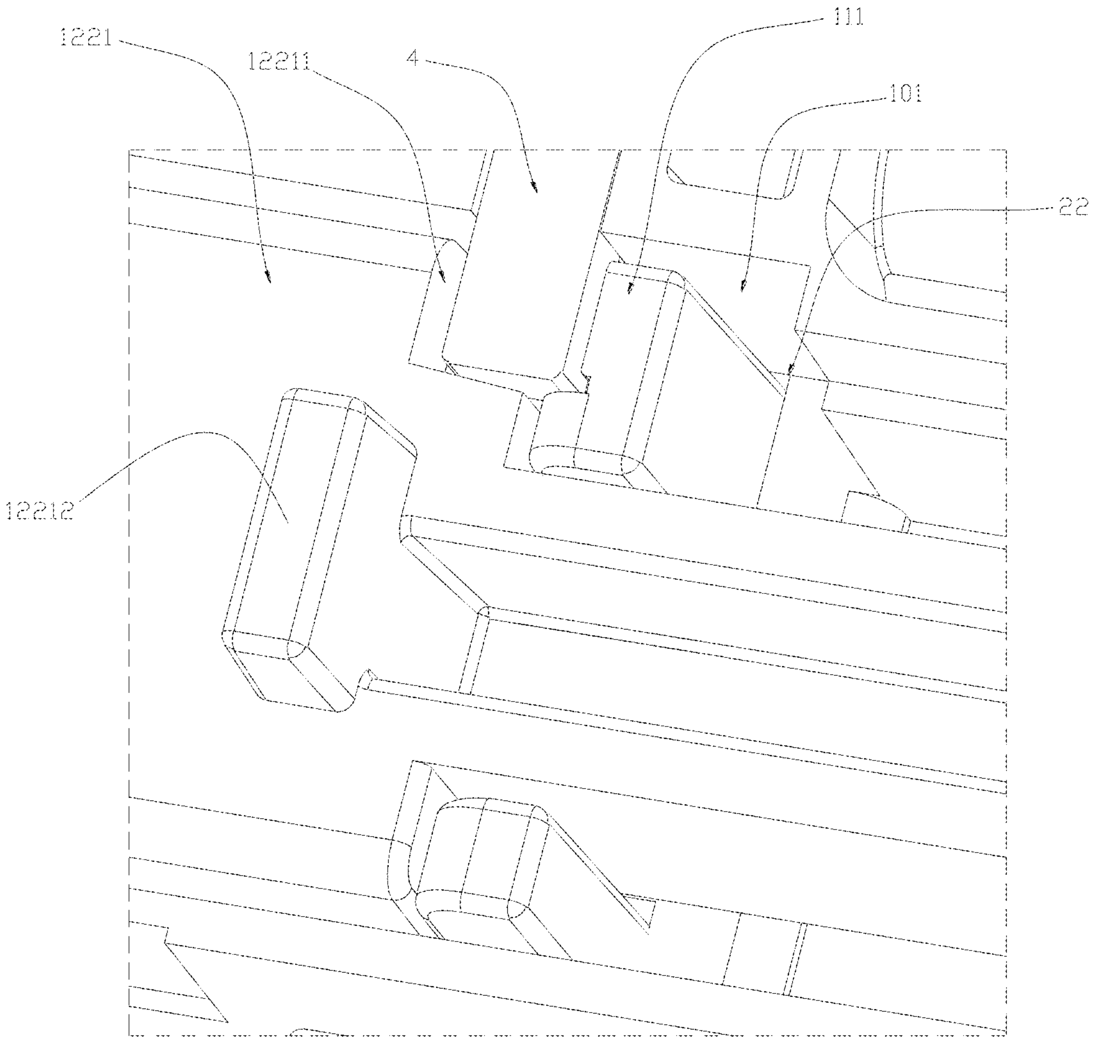
FIG. 5 is a partially enlarged diagram of part B.
Figure 6:
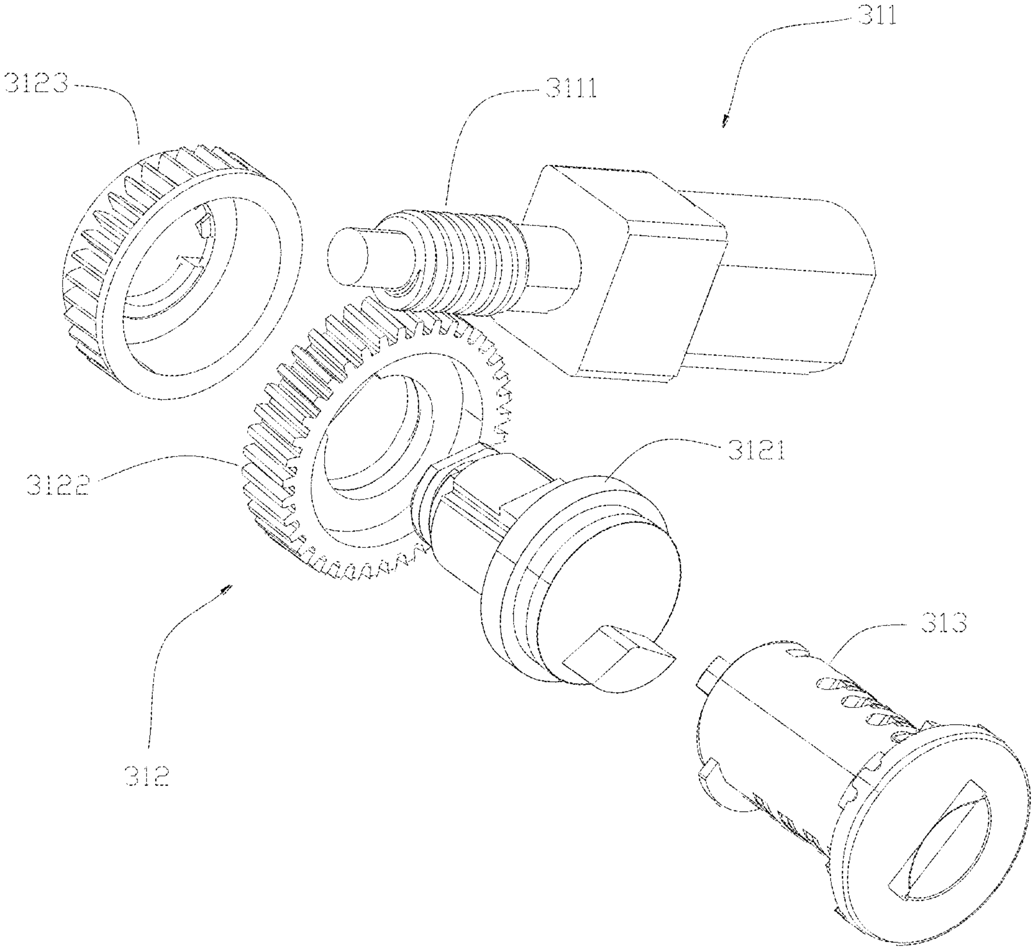
FIG. 6 is an exploded state diagram of a first clutch device.
Figure 7:
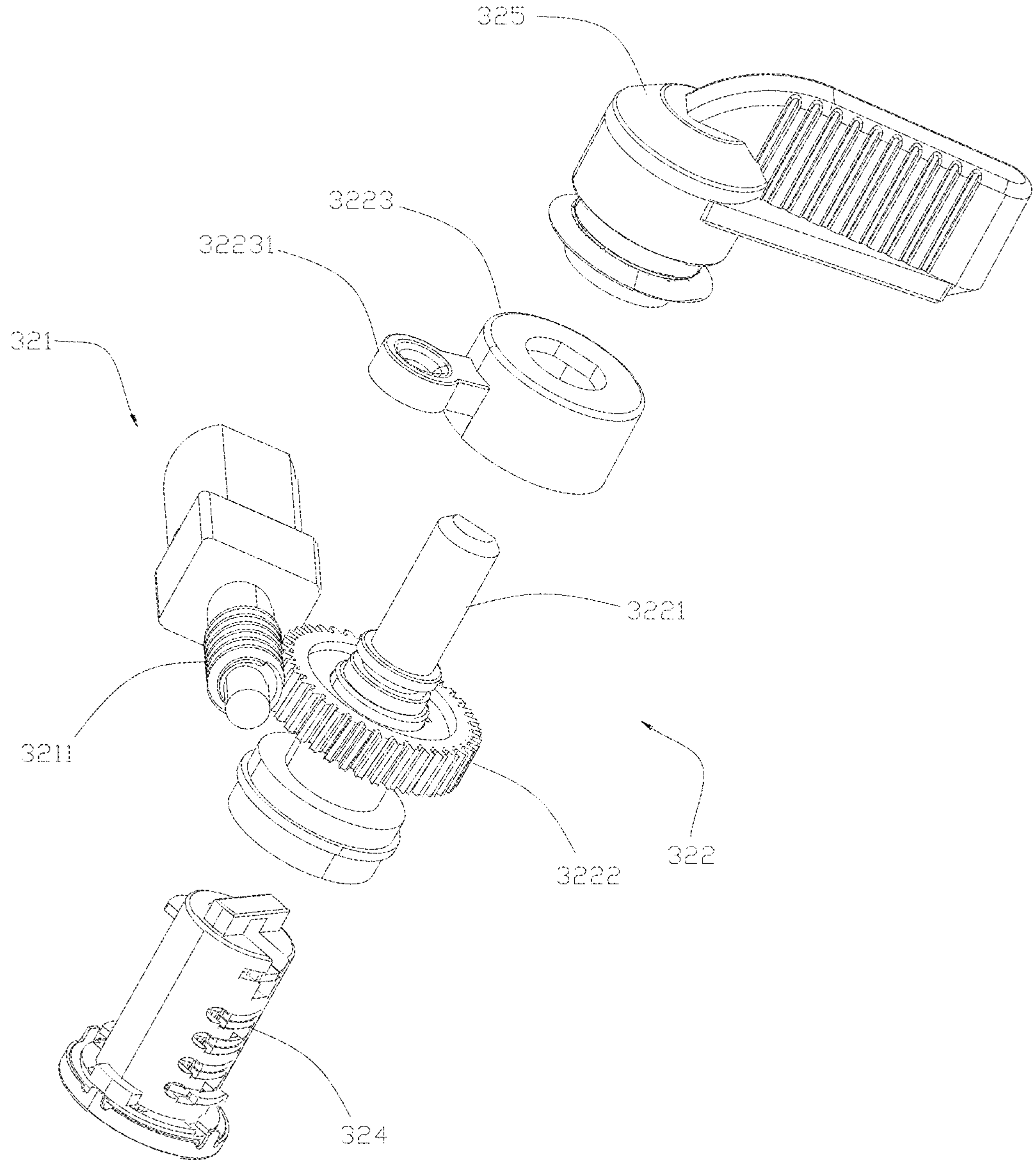
FIG. 7 is an exploded state diagram of a second clutch device.

As shown in FIG. 1 to FIG. 7, the present disclosure provides a novel electronic door lock, including a shell 1, an outer handle 11, and an elastic sliding tongue 12 arranged in the shell 1. The elastic sliding tongue 12 is threaded out from the first opening 21 of the shell 1 to lock the door lock. The outer handle 11 acts on the elastic sliding tongue 12. When a force is applied to the outer handle 11, the outer handle 11 will push the elastic sliding tongue 12 to retract back to the shell 1 from the first opening 21 to unlock the door lock.

Further, a first clutch device 31 and a limiting member 4 are further arranged inside the shell 1. The first clutch device 31 includes a first motor 311 and a first transmission assembly 312 connected to the first motor 311 in a transmission manner. The first transmission assembly 312 is connected to the limiting member 4. The first transmission assembly 312 drives the limiting member 4 to move to limit the pushing performed by the outer handle 11 on the elastic sliding tongue 12.

Through the above arrangement, when the outer handle 11 needs to be limited from performing unlocking, the first motor 311 can be activated to drive the limiting member 4 to move through the first transmission assembly 312, and the outer handle 11 is deadly locked to limit the pushing performed by the outer handle 11 on the elastic sliding tongue 12, thereby preventing outside staff from unlocking the door lock through the outer handle 11.

It can be understood that the first clutch device 31 of the present disclosure can achieve the limitation on the outer handle 11 by cooperating with the limiting member 4 due to the arrangement of the first motor 311 and the first transmission assembly 312. The novel electronic door lock has a simple structure, convenience of operation, production, and assembling, and high mechanical stability. The production efficiency is improved; the production cost is reduced; the yield of the product is further increased; and the user experience is greatly enhanced.

Further, in this embodiment, the electronic door lock further includes a first mounting slot 101 provided in the shell 1. The first mounting slot 101 is configured to mount the elastic sliding tongue 12. Specifically, one end of the first mounting slot 101 extends outwards to the shell 1 to form the first opening 21; the elastic sliding tongue 12 is slidably arranged in the first mounting slot 101; the elastic sliding tongue 12 includes an elastic member 121 and a sliding tongue 122; one end of the elastic member 121 is abutted to the other end of the first mounting slot 101; and the other end of the elastic member 121 is abutted to the sliding tongue 122. Through the above arrangement, in a normal state of the door lock, the elastic member 121 can provide a thrust to the sliding tongue 122, to push the sliding tongue 122 out from the first opening 21, thereby locking the door lock.

Further, in this embodiment, the shell 1 further includes a second opening 22; the second opening 22 is arranged on one side of the shell 1 and penetrates through a side wall of the first mounting slot 101; the outer handle 11 is provided with a first unlocking lever 111; and the first unlocking lever 111 penetrates into the second opening 22 and is abutted to the sliding tongue 122. Specifically, in this embodiment, one end of the sliding tongue 122 close to the elastic member 121 forms a pushing portion 1221; one end of the pushing portion 1221 is abutted to the elastic member 121; and the other end is abutted to the first unlocking lever 111.

Through the above arrangement, in the normal state of the door lock, the sliding tongue 122 is pushed by the elastic member 121 and will move towards the first opening 21 until the pushing portion 1221 is abutted to the first unlocking lever 111. The first unlocking lever 111 blocks the sliding tongue 122. At this time, the sliding tongue 122 extends out of the first opening 21 to lock the door lock. When a force is applied to the outer handle 11, the first unlocking lever 111 can provide a force facing the elastic member 121 to the pushing portion 1221 to compress the elastic member 121 and make the sliding tongue 122 retract back to the shell 1 from the first opening 21, thereby unlocking the door lock.

Further, in this embodiment, a limiting hole is provided at one end of the pushing portion 1221 close to the elastic member 121; and the limiting hole is configured to plug the elastic member 121, so as to improve the stability of connection between the elastic member 121 and the pushing portion 1221.

Further, in this embodiment, a limiting slot 12211 is provided at one end of the pushing portion 1221 close to the first unlocking lever 111; the limiting member 4 is movably arranged on one side of the limiting slot 12211; and the limiting member 4 can move back and forth relative to the limiting slot 12211 under the action of the first clutch device 31.

Through the above arrangement, when the outer handle 11 is limited, the first transmission assembly 312 can drive the limiting member 4 to be inserted into the limiting slot 12211. At this time, the movement of the first unlocking lever 111 will be blocked by the limiting member 4, so as to limit the pushing performed by the first unlocking lever 111 on the pushing portion 1221. Similarly, releasing the limitation on the outer handle 11 will not be elaborated here.

Further, in this embodiment, to facilitate internal personnel to unlock the door lock, an inner handle 13 is further arranged on the other side of the shell 1. The inner handle 13 acts on the pushing portion 1221 to push the elastic sliding tongue 12 to retract back to the shell 1 from the first opening 21. Specifically, the shell 1 further includes a third opening 23. The third opening 23 penetrates through a side wall of the first mounting slot 101. The inner handle 13 is provided with a second unlocking lever 131, and the pushing portion 1221 is provided with a third unlocking lever 12212. The second unlocking lever 131 penetrates into the third opening 23 and is abutted to the third unlocking lever 12212.

Through the above arrangement, during unlocking by internal personnel, a force can be applied to the inner handle 13 to drive the second unlocking lever 131 to move in a direction of compressing the elastic member 121. As the third unlocking lever is abutted to the second unlocking lever, the second unlocking lever will synchronously drive the third unlocking lever to move, so as to push the elastic sliding tongue 12 to retract back to the shell 1 from the first opening 21.

Further, in this embodiment, as a specific implementation of the first clutch device 31, a first worm 3111 is arranged at a driving end of the first motor 311; the first transmission assembly 312 includes a first transmission shaft 3121, a first transmission gear 3122, and a second transmission gear 3123; the limiting member 4 is a gear; the first transmission gear 3122 and the second transmission gear 3123 are both connected to the first transmission shaft 3121, and the first transmission gear 3122 is arranged below the second transmission gear 3123; the first worm 3111 is in meshing connection to the first transmission gear 3122; and the limiting member 4 is in meshing connection to the second transmission gear 3123.

Through the above arrangement, when the first motor 311 works, kinetic energy can be transmitted to the first transmission gear 3122 through the first worm 3111 to drive the first transmission gear 3122 to rotate. The rotating first transmission gear 3122 synchronously drives the first transmission shaft 3121 to rotate, and then drives the second transmission gear 3123 to rotate. The limiting member 4 achieves reciprocating motion relative to the limiting slot 12211 under the action of the second transmission gear 3123, so that the structure is simple, the design is ingenious, and the stability is high.

Further, the door lock of the present disclosure further includes a first driving module. The first driving module is in communicative connection to the first motor 311 and a control terminal respectively. Specifically, the control terminal can be a mobile device such as a mobile phone or tablet. Through the above arrangement, a user can remotely control the door lock through the control terminal. The operation is convenient, and the technical problem "The traditional door lock cannot be unlocked as a user forgets to carry a key" is solved.

Further, in this embodiment, the first clutch device 31 further includes a first lock cylinder 313; and the first lock cylinder 313 is connected to the first transmission shaft 3121 in a transmission manner. Through the above arrangement, a user can control the first lock cylinder 313 through a key to drive the first transmission shaft 3121 to move, thereby controlling the limitation on the outer handle.

Further, in this embodiment, the shell 1 further includes a safety tongue 14, a second clutch device 32, and a fourth opening 24; the second clutch device 32 includes a second motor 321 and a second transmission assembly 322 connected to the second motor 321 in a transmission manner; and the second transmission assembly 322 is connected to the safety tongue 14 to drive expansion and retraction of the safety tongue 14 in the fourth opening 24.

Through the above arrangement, a user can control the second motor 321 to drive the expansion and retraction of the safety tongue 14 in the fourth opening 24, so as to further improve the safety of the door lock. As a preference, the door lock further includes a second driving module. The second driving module is in communicative connection to the second motor 321 and the control terminal. Based on the above setting, the user can remotely control the door lock through the control terminal. The operation is convenient.

Further, in this embodiment, a second worm 3211 is arranged at a driving end of the second motor 321; the second transmission assembly 322 includes a second transmission shaft 3221, a third transmission gear 3222, and an eccentric transmission wheel 3223; the third transmission gear 3222 and the eccentric transmission wheel 3223 are both connected to the second transmission shaft 3221; the second worm 3211 is in meshing connection to the third transmission gear 3222; and the eccentric transmission wheel 3223 is connected to the safety tongue 14 in a transmission manner. Specifically, the second clutch device 32 further includes a connecting rod 323; the eccentric transmission wheel 3223 includes an eccentric portion 32231; both the eccentric portion 32231 and the safety tongue 14 are provided with connecting holes; and the connecting rod 323 passes through the connecting holes to achieve connection between the eccentric portion 32231 and the safety tongue 14.

Through the above arrangement, when the second motor 321 works, kinetic energy is transmitted to the third transmission gear 3222 through the second worm 3211 to enable the third transmission gear 3222 to rotate. The rotating third transmission gear 3222 drives the second transmission shaft 3221 to rotate, thereby driving the eccentric transmission wheel 3223 to rotate. The rotating eccentric transmission wheel 3223 transfers the kinetic energy to the safety tongue 14 through the eccentric portion 32231 and the connecting rod 323 to drive the expansion and retraction of the safety tongue 14 in the fourth opening 24.

Furthermore, in this embodiment, the second clutch device 32 further includes a second lock cylinder 324; and the second lock cylinder 324 is connected to one end of the second transmission shaft 3221 in a transmission manner. Through the above arrangement, a user can control the second lock cylinder 324 through a key to drive the second transmission shaft 3221 to move, thereby controlling the safety tongue 14.

Further, in this embodiment, the second clutch device 32 further includes a safety tongue knob 325. The safety tongue knob 325 is arranged on the other side of the shell 1 and is connected to the other end of the second transmission shaft 3221 in a transmission manner. Through the above arrangement, internal personnel can control the safety tongue 14 by spinning the safety tongue knob 325.

Further, in this embodiment, the shell 1 further includes a power supply compartment. The power supply compartment is configured to accommodate a power supply to supply power to the first motor 311 and the second motor 321.

Further, in this embodiment, the shell 1 is provided with a digital password module 5 on one side of the outer handle 11; and the digital password module 5 is in communicative connection to the first motor 311. A user can drive the first motor 311 by operating the digital password module 5, thereby controlling the limitation on the outer handle 11.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. An electronic door lock, comprising a shell, an outer handle, and an elastic sliding tongue arranged in the shell, wherein the elastic sliding tongue is configured to slide out from a first opening of the shell; the outer handle acts on the elastic sliding tongue to push the elastic sliding tongue back to the shell from the first opening; the shell comprises a first clutch device and a limiting member; the first clutch device comprises a first motor and a first transmission assembly connected to the first motor in a transmission manner; the first transmission assembly is connected to the limiting member; and the first transmission assembly drives the limiting member to move to limit the pushing performed by the outer handle on the elastic sliding tongue;

wherein a first worm is arranged at a driving end of the first motor; the first transmission assembly comprises a first transmission shaft, a first transmission gear, and a second transmission gear; the limiting member is a gear; the first transmission gear and the second transmission gear are both connected to the first transmission shaft; the first worm is in meshing connection to the first transmission gear; and the limiting member is in meshing connection to the second transmission gear.

2. The electronic door lock according to claim 1, further comprising a first mounting slot provided in the shell, wherein one end of the first mounting slot extends to the shell to form the first opening; the elastic sliding tongue is slidably arranged in the first mounting slot; the elastic sliding tongue comprises an elastic member and a sliding tongue; one end of the elastic member is abutted to the other end of the first mounting slot; and the other end of the elastic member is abutted to the sliding tongue to push the sliding tongue to be threaded out of the first opening.

3. The electronic door lock according to claim 2, wherein the shell further comprises a second opening; the second opening penetrates through a side wall of the first mounting slot; the outer handle is provided with a first unlocking lever; and the first unlocking lever penetrates into the second opening and is abutted to the sliding tongue.

4. The electronic door lock according to claim 3, wherein one end of the sliding tongue close to the elastic member forms a pushing portion; one end of the pushing portion is abutted to the elastic member; and the other end is abutted to the first unlocking lever.

5. The electronic door lock according to claim 4, wherein a limiting hole is provided at one end of the pushing portion close to the elastic member; and the limiting hole is configured to plug the elastic member.

6. The electronic door lock according to claim 4, wherein a limiting slot is provided at one end of the pushing portion close to the first unlocking lever; and the limiting member penetrates into the limiting slot to limit the pushing performed by the first unlocking lever on the pushing portion.

7. The electronic door lock according to claim 4, wherein the electronic door lock further comprises an inner handle; and the inner handle acts on the pushing portion to push the elastic sliding tongue to retract into the shell from the first opening.

8. The electronic door lock according to claim 7, wherein the shell further comprises a third opening; the third opening penetrates through a side wall of the first mounting slot; the inner handle is provided with a second unlocking lever; the pushing portion is provided with a third unlocking lever; and the second unlocking lever penetrates into the third opening and is abutted to the third unlocking lever.

9. The electronic door lock according to claim 1, wherein the first clutch device further comprises a first lock cylinder; and the first lock cylinder is connected to the first transmission shaft in a transmission manner.

10. The electronic door lock according to claim 1, wherein the electronic door lock further comprises a first driving module; and the first driving module is in communicative connection to the first motor and a control terminal respectively.

11. The electronic door lock according to claim 1, wherein the shell is provided with a digital password module on one side of the outer handle; and the digital password module is in communicative connection to the first motor.

12. An electronic door lock, comprising a shell, an outer handle, and an elastic sliding tongue arranged in the shell, wherein the elastic sliding tongue is configured to slide out from a first opening of the shell; the outer handle acts on the elastic sliding tongue to push the elastic sliding tongue back to the shell from the first opening; the shell comprises a first clutch device and a limiting member; the first clutch device comprises a first motor and a first transmission assembly connected to the first motor in a transmission manner; the first transmission assembly is connected to the limiting member; and the first transmission assembly drives the limiting member to move to limit the pushing performed by the outer handle on the elastic sliding tongue;

wherein the shell further comprises a safety tongue, a second clutch device, and a fourth opening; the second clutch device comprises a second motor and a second transmission assembly connected to the second motor in a transmission manner; and the second transmission assembly is connected to the safety tongue to drive expansion and retraction of the safety tongue in the fourth opening.

13. The electronic door lock according to claim 12, wherein a second worm is arranged at a driving end of the second motor; the second transmission assembly comprises a second transmission shaft, a third transmission gear, and an eccentric transmission wheel; the third transmission gear and the eccentric transmission wheel are both connected to the second transmission shaft; the second worm is in meshing connection to the third transmission gear; and the eccentric transmission wheel is connected to the safety tongue in a transmission manner.

14. The electronic door lock according to claim 13, wherein the second clutch device further comprises a connecting rod; the eccentric transmission wheel comprises an eccentric portion; both the eccentric portion and the safety tongue are provided with connecting holes;

and the connecting rod passes through the connecting holes to achieve connection between the eccentric portion and the safety tongue.

15. The electronic door lock according to claim 13, wherein the second clutch device further comprises a second lock cylinder;

and the second lock cylinder is connected to one end of the second transmission shaft in a transmission manner.

16. The electronic door lock according to claim 15, wherein the second clutch device further comprises a safety tongue knob; and the safety tongue knob is connected to the other end of the second transmission shaft in a transmission manner.

17. The electronic door lock according to claim 12, wherein the electronic door lock further comprises a second driving module;

and the second driving module is in communicative connection to the second motor and the control terminal respectively.

* * * * *